Figure 4:
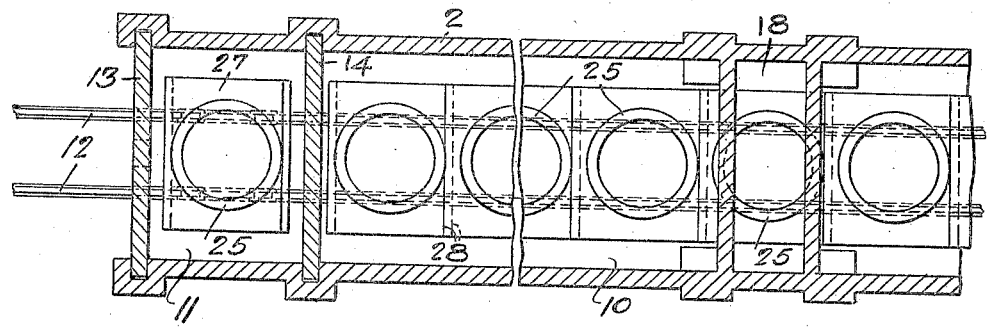

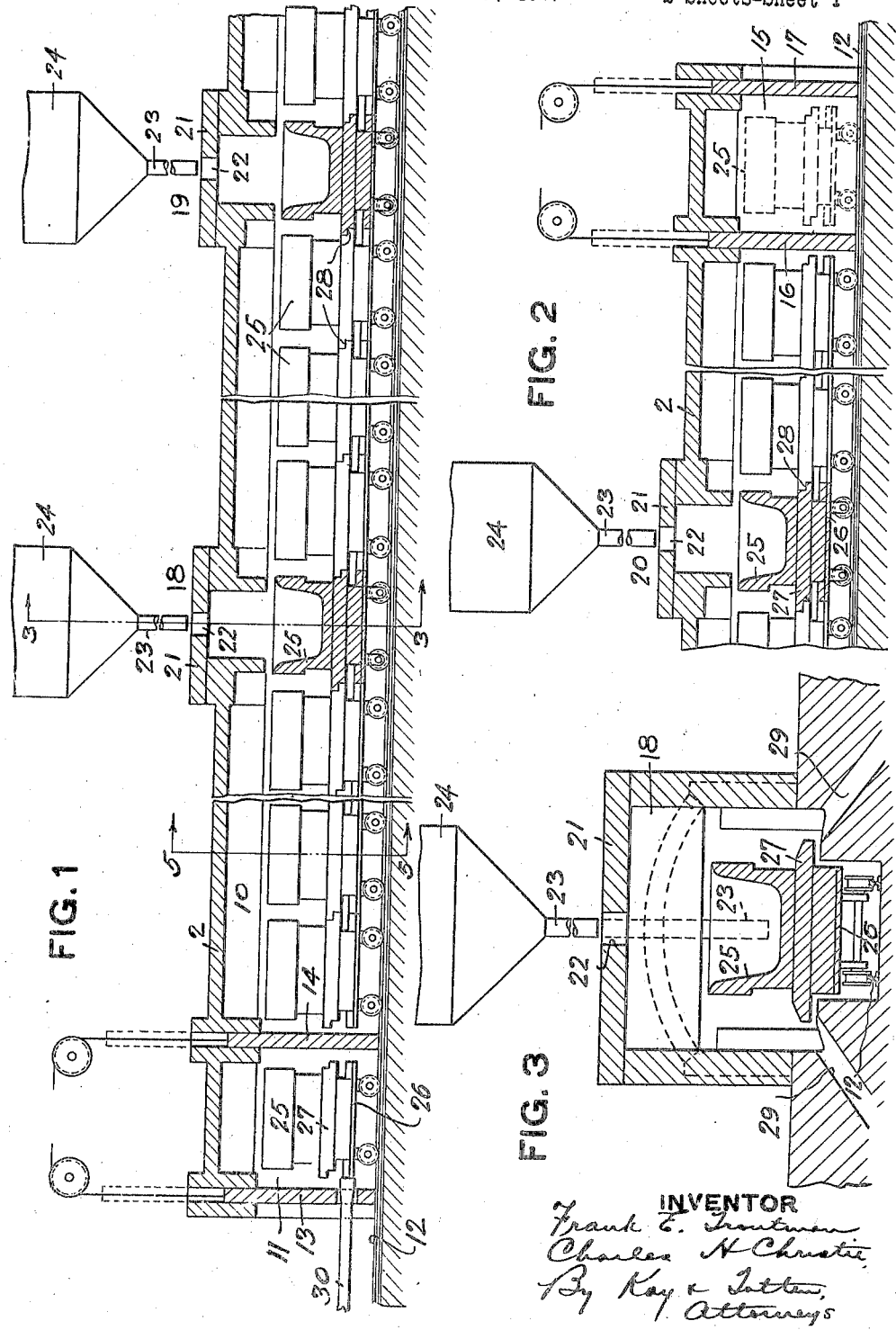
Dec. 4, 1923.
F. E. TROUTMAN ET AL
METHOD OF MELTING GLASS IN POTS
Filed March 13, 1920
1,476,431
2 Sheets-Sheet 1

Dec. 4, 1923.  1,476,431

F. E. TROUTMAN ET AL

METHOD OF MELTING GLASS IN POTS

Filed March 13, 1920  2 Sheets-Sheet 2

INVENTOR
Frank E. Troutman
Charles N. Christie,
By Kay & Totten,
Attorneys

Patented Dec. 4, 1923.

1,476,431

UNITED STATES PATENT OFFICE.

FRANK E. TROUTMAN AND CHARLES H. CHRISTIE, OF BUTLER, PENNSYLVANIA.

METHOD OF MELTING GLASS IN POTS.

Application filed March 13, 1920. Serial No. 365,483.

*To all whom it may concern:*

Be it known that we, FRANK E. TROUTMAN and CHARLES H. CHRISTIE, citizens of the United States, and residents of Butler, in the county of Butler and State of Pennsylvania, have invented a new and useful Improvement in Methods of Melting Glass in Pots; and we do hereby declare the following to be a full, clear, and exact description thereof.

Our invention relates to a method of melting glass in pots.

In the manufacture of plate-glass, the glass which is discharged upon the casting table to be rolled into a plate or sheet is melted in individual pots. These pots are first pre-heated in a furnace built for that purpose and are raised to a temperature of about 1800° F. After this pre-heating, the pots are then introduced into the melting furnace in which the temperature is raised to about 2500° F. to effect the melting of the glass. During this melting operation, portions of batch are introduced into the pot by suitable charging apparatus, which is introduced through an opening in the side-wall of the furnace or roof and by means of which batch is discharged into the pots until the proper amount has been introduced into each pot to obtain a pot full of molten glass. After the melting stage has been reached, the temperature of the glass is raised to approximately 2600° F. when the "fining" of the glass takes place. When the glass is "finished" the temperature of the furnace is then reduced so that the glass, when the pot is removed for pouring, has a temperature of about 2000° F. At this temperature, the glass is in the right state of fluidity for rolling when discharged upon the casting table.

The above is the method heretofore generally practiced in the melting of the glass in pots for the manufacture of plate-glass, and the object of our present invention is to provide a method by which a plurality of pots may be successively filled by additions of batch from time to time and the glass melted and "fined" therein while passing in a continuous manner through a heated chamber, thereby making it possible to introduce a preheated pot or a pot just emptied at one end of the furnace, charge it from time to time, and pass it through to the opposite end, where the glass is in condition for pouring on the casting table.

To these ends our invention consists, generally stated, in the method of melting glass in pots consisting in preheating the original pots, introducing the same, one at a time, into a heating chamber, moving the pots through said chamber, raising the temperature to the proper degree in the said chamber as the pots move through same whereby the glass in said pots is melted and "fined," and introducing batch to said pots at intervals in their passage through said melting chamber.

Figure 5:
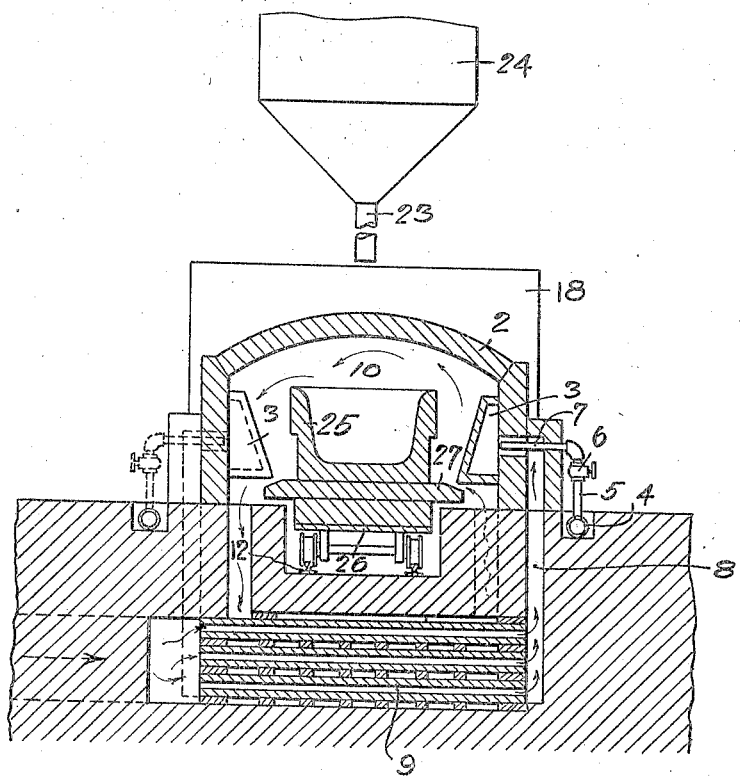

In the accompanying drawings, Fig. 1 is a side elevation in section of a portion of a melting furnace suitable for carrying out my invention; Fig. 2 shows the discharge or rear end of the melting furnace; Fig. 3 is a cross section on the line 3—3, Fig. 1; Fig. 4 is a plan view of a portion of the melting furnace; and Fig. 5 is an enlarged section on the line 5—5, Fig. 1.

In an application of even date herewith, Serial No. 365,484, we have illustrated and described a glass pot melting furnace, and I have illustrated in connection with our present invention this same form of melting furnace as suitable for carrying out the method of the present invention.

In the drawing, the numeral 2 designates the heating furnace which may be of the muffle type with the combustion chambers 3 extending along the side walls. Where gas is employed as a fuel, the gas line 4 extends along the side of the furnace, and branch pipes 5 controlled by valves 6 extend from said main line at intervals. The burners 7 are connected up to the branch pipes 5. Air to support combustion is fed to the burners by the flues 8 which is connected up with an ordinary recuperator 9. Any suitable manner, however, of heating the melting chamber 10 may be employed.

At the front end of the furnace is the vestibule 11 with the tracks 12 leading into said vestibule being provided with the outer door 13 and the inner door 14. The track 12 extends the entire length of the furnace and at its rear or discharge end a vestibule 15 is provided with doors 16 and 17. At intervals charging stations 18, 19 and 20 are provided, the number of said charging stations being dependent only on the length of the furnace or upon how much material one wishes to "fill" at any one time. At these charging stations the top plates 21 are provided with openings 22 to receeive the discharge spouts 23 of the hoppers 24 containing the batch.

These hoppers may be fed by suitable overhead carrriers for delivering batch to the different hoppers as required. In order to provide for the discharge of the batch well down in the pots 25, the spouts 23 are made adjustable in length so as to be extended or withdrawn as desired, and so as not to interfere with the movement of the pots which are carried on the trucks 26. If desired the pots may also be filled through openings in side.

The pots 25 rest upon the refractory supports 27, the front and rear ends of said supports being rabbeted as at 28 so that when passing through the furnace, the several supports of the different trucks will form a rabbeted joint with each other.

At the charging stations overflow gutters 29 are provided for any overflow from the pots at the charging station. These may be provided at any desired place in the furnace.

A suitable charger or pusher 30 may be provided at the front end of the furnace for advancing the trucks, and each time a truck is advanced from the vestibule 11 into the main part of the furnace by raising the door 14 the advance of said truck coming in contact with the preceding truck will advance the whole line of trucks the distance of the length of one of the supports 27. In this manner, the trucks are moved intermittently through the furnace. Any suitable manner of moving the trucks may be employed.

In carrying out our method, the cold pots in the first instance having been preheated to the proper temperature either in a separate heating chamber or with the heat acquired by having been passed through the furnace and discharged of their lot of molten glass, are introduced one by one into the furnace passing first into the vestibule 11. The door 13 is then closed and the door 14 opened whereupon a pusher 30 advances the pot into the main heating chamber of the furnace. The pots, as they are advanced in this intermittent manner, are raised in temperature, and at the first charging station 18 the first charge of batch is introduced into the pot. This batch is partially melted before reaching the second charging station where a second portion of batch is introduced, and again at a third or more charging stations additional batch material is added until sufficient material is in the pot. The temperature of the furnace is increased toward the rear end, the temperature for instance at the first charging station being, say,. 2200° F. and gradually raising to 2500° F. between the first and second charging stations and kept at approximately that temperature until the third charging station is reached, and from there on where the finishing or "fining" of the glass takes place the temperature is raised to approximately 2600° F. These temperatures are, of course, only relative or approximate, and we do not wish in any sense to limit ourselves to the temperatures stated.

After finishing or fining the glass which takes place after the last addition of batch, the pot passes into a zone of lower temperature and finally into the rear vestibule 15, and the temperature of the glass having been reduced to the proper temperature for pouring, the door 17 is raised and the pot passes from the furnace to be taken to the casting table where the glass, after being discharged, is rolled out into a plate or sheet in the ordinary manner.

By this method, the operation of melting glass in pots is a continuous one, as the pot just emptied is immediately transferred to the front end of the furnace where it is admitted and passed through the different zones of heat with the admission from time to time of the batch, the pot in this manner being used in continuous cycles so that there is no delay and greater output is obtained. Furthermore, the charging of the pots as they move along in this manner from time to time, is done without the loss of practically any heat, or loss of time by holding the temperature of a whole furnace until the last pot is cast. There is no waste of batch and the men are protected from all hot labor of filling and charging.

What we claim is:

1. The method of melting glass in pots consisting in introducing the pots into a heating chamber moving the pots through said chamber, maintaining the temperature in said chamber as the pots move through same whereby the glass is melted and fined, and admitting batch to said pots at intervals in their passage through said heating chamber, the said pots being introduced into said heating chamber and removed therefrom without exposing said chamber to the outer air.

2. The method of melting glass in pots consisting in pre-heating the pots, introducing them into a heating chamber, moving the pots through said chamber, maintaining the temperature in said chamber as the pots move through same whereby the glass is melted and fined, and admitting batch to said pots at intervals in their passage through said heating chamber, the said pots being introduced into said heating chamber and removed therefrom without exposing said chamber to the outer air.

3. The method of melting glass in pots consisting in introducing the pots one by one into a heating chamber, moving said pots intermittently by the introduction of a new pot, maintaining the temperature in said chamber as the pots move through same whereby the glass is melted and fined, and admitting batch to said pots at intervals in their passage through said heating chamber.

the said pots being introduced into said heating chamber and removed therefrom without exposing said chamber to the outer air.

4. The method of melting glass in pots consisting in introducing the pots into a heating chamber, moving the pots through said chamber, maintaining the temperature in said chamber as the pots move through same whereby the glass is melted and fined, admitting batch to said pots at intervals in their passage through said heating chamber, and reducing the temperature of the glass for casting, the said pots pots being introduced into said heating chamber and removed therefrom without exposing said chamber to the outer air.

5. The method of melting glass in pots consisting in introducing the pots one by one into a heating chamber, each preceding pot being moved at the admission of the succeeding pot, maintaining the temperature in said chamber as the pots move through same whereby the glass is melted and fined, and admitting batch to said pots at intervals in their passage through said heating chamber, the said pots being introduced into said heating chamber and removed therefrom without exposing said chamber to the outer air.

6. The method of melting glass in pots consisting in introducing the pots one by one into a long relatively narrow furnace, admitting batch to said pots at intervals in their passage through said heating chamber, maintaining temperatures in this furnace to respectively heat the pot, melt the batch, finish the glass and cool it sufficiently for casting and removing the pots from the opposite end, the said pots being introduced into said heating chamber and removed therefrom without exposing said chamber to the outer air.

7. The method of melting glass in pots consisting in introducing the empty pots into one end of a furnace, and charging said pots with dry batch at intervals in their passage through said heating chamber, melting the charge, and finishing the same during the passage of said pots through said furnace.

8. The method of melting glass in pots consisting in introducing the empty pots into one end of the furnace, moving the pots intermittently through the furnace, and charging said pots with dry batch at intervals in their passage through said heating chamber, melting the charge, finishing the charge, and partially cooling the charge during the passage of said pots through the furnace.

In testimony whereof, we, the said FRANK E. TROUTMAN and CHARLES H. CHRISTIE, have hereunto set our hands.

FRANK E. TROUTMAN.
CHARLES H. CHRISTIE.

Witnesses:
WM. F. RAUSCHENBERGER,
A. J. GUMPPER.